United States Patent

Hasegawa et al.

[11] Patent Number: 5,838,373
[45] Date of Patent: Nov. 17, 1998

[54] IMAGING CIRCUIT HAVING INTERLACED AND NON-INTERLACED MODE

[75] Inventors: Takami Hasegawa, Yokohama; Choji Umemoto, Wakayama, both of Japan

[73] Assignees: Protec Japan Corporation, Yokohama; Noritsu Koki Co., Ltd., Wakayama, both of Japan

[21] Appl. No.: 724,837

[22] Filed: Oct. 3, 1996

[30] Foreign Application Priority Data

Oct. 17, 1995 [JP] Japan .................................. 7-268134

[51] Int. Cl.⁶ .............................. H04N 3/14; H04N 7/01; H04N 5/228
[52] U.S. Cl. .......................... 348/312; 348/222; 348/446
[58] Field of Search ................... 348/222, 312, 348/322, 446, 317, 320, 324, 220

[56] References Cited

U.S. PATENT DOCUMENTS

| | | | |
|---|---|---|---|
| 4,943,850 | 7/1990 | Asaida | 348/312 |
| 5,051,832 | 9/1991 | Losee et al. | 348/220 |
| 5,272,535 | 12/1993 | Elabd | 348/322 |
| 5,394,187 | 2/1995 | Shipp | 348/322 |
| 5,402,171 | 3/1995 | Tagami et al. | 348/219 |
| 5,631,701 | 5/1997 | Miyake | 348/222 |
| 5,734,424 | 3/1998 | Sasaki | 348/220 |

*Primary Examiner*—Andrew I. Faile
*Assistant Examiner*—Luong Nguyen
*Attorney, Agent, or Firm*—Kubovcik & Kubovcik

[57] ABSTRACT

An imaging circuit includes a solid state imaging device, an A/D converter for converting light receiving signals outputted from the solid state imaging device to digital signals, and a driving unit for supplying clock signals to the solid state imaging device and the A/D converter. The solid state imaging device has a first mode in which the light receiving signals on two adjacent scanning lines arranged in the vertical direction are added to each other and outputted, and a second mode in which the light receiving signals on one scanning line are sequentially outputted in units of scanning lines, the first and second modes being optionally selectable in accordance with a predetermined mode selection signal. In the driving unit, when the solid state imaging device is selected to the first mode, a clock signal having a first repetitive frequency is transmitted to the solid state imaging device and another clock signal having a second repetitive frequency lower than the first repetitive frequency is transmitted to the A/D converter, and when the solid state imaging device is selected to the second mode, a clock signal having a predetermined repetitive frequency is transmitted to the solid state imaging device and the A/D converter.

2 Claims, 5 Drawing Sheets

IMAGING CIRCUIT HAVING INTERLACED AND NON-INTERLACED MODE

BACKGROUND OF THE INVENTION

1. Field of the Invention

The present invention relates to an imaging circuit for continuously outputting light receiving signals derived through a plurality of light receiving elements.

2. Description of the Related Art

Hitherto, there are generally used imaging apparatuses, in which light receiving signals derived through a plurality of light receiving elements arranged on a two-dimensional basis are scanned to obtain two-dimensional images, as video cameras for television broadcasting purposes and home video use and also as video cameras of image processing apparatuses for industrial use.

Especially, recently, as an imaging circuit for video camera purposes using solid state imaging devices, which are adapted to provide a large number of pixels and to implement a high processing speed, is developed in accordance with an advance of a semiconductor technology, high resolution of image data can be obtained. Further, an A/D (analog/digital) converter is incorporated into the imaging circuit, so that digital image data can be obtained. Thus, a high-grade of data processing becomes possible.

However, the imaging circuit using the above-mentioned solid state imaging devices involves such a problem that a dynamic range of the obtained image data is narrow. Generally, a dynamic range of the photographic film used widely in recording of images is about 80 db regardless of still-picture image or dynamic picture image. However, when this is analyzed with the usual video camera, only resolution of the order of about 55 db is obtained. Accordingly, analytical power for data is determined by resolution of the used video camera, or the S/N ratio. Consequently, in many cases, even if it is intended that a photographic film is photographed with a video camera and its output data are subjected to an image processing, information content which the photographic film has is lost for the most part, and thus a satisfactory processing result cannot be obtained.

Now let us consider such a case that a video camera is used in a photo development processing apparatus for determining the print condition suitable for the respective image in such a manner that for example, the exposure condition of images of a negative film of a photo developed is analyzed for each frame, and the exposure is decreased in order to emphasize white in a case where an image is all white in its entirety as a snow scene, or the exposure is increased in order to make up the underexposure in a case where an image is blackish as a person who is in back light. A video camera having the usual narrow dynamic range cannot follow in the footsteps of a photo film having the wide dynamic range. Thus, it is desired to provide an imaging circuit having a high dynamic range, which is applicable for such a use.

Further, recently, there have been developed new uses such that photographs taken by a video camera are provided in the form of an index print as a hard copy, video images are printed out from a video printer, and video images are digitized and stored in a storage medium such as a floppy disk. In case of such uses, there are needed not only the problem of the dynamic range, but also a high resolution.

By the way, as performance required for this type of video image processing apparatus, a processing speed is also important in addition to the resolution and the dynamic range. However, it is difficult to implement an imaging circuit satisfying all of those features of the performance. For example, if it is intended to obtain the high dynamic range and the high processing speed, the resolution will be sacrificed. On the other hand, if it is intended to obtain the high resolution and the high dynamic range, the processing speed will be sacrificed.

Consequently, hitherto, there is no way other than such a manner that a plurality of video cameras each having an imaging circuit adapted to the respective use are prepared beforehand and are chosen according to a use.

SUMMARY OF THE INVENTION

In view of the foregoing, it is therefore an object of the present invention to provide an imaging circuit having an output mode of high dynamic range and an output mode of high resolution, wherein said imaging circuit is capable of choosing the modes in two ways of use through a simple mode selection operation.

To achieve the above-mentioned objects, according to the present invention, there is provided an imaging circuit comprising: a solid state imaging device in which a plurality of scanning lines each comprising a plurality of light receiving elements arranged in a predetermined first direction are arranged in a second direction intersecting the first direction, said solid state imaging device sequentially outputting in response to a predetermined first clock signal light receiving signals derived through the light receiving elements arranged on a same scanning line so that the light receiving signals are continuously outputted; and an A/D converter for converting the light receiving signals outputted from said solid state imaging device to digital signals in accordance with a predetermined second clock signal, wherein said solid state imaging device has a first mode in which the light receiving signals of a plurality of light receiving elements on a plurality of adjacent scanning lines arranged in the second direction are added to each other and outputted on a plurality of scanning lines basis, and a second mode in which the light receiving signals of the plurality of light receiving elements arranged on one scanning line are sequentially outputted on a one-by-one scanning line basis, said first and second modes being optionally selectable in accordance with a predetermined mode selection signal, and wherein said imaging circuit further comprises a driving unit in which when said solid state imaging device is selected in an operation mode to the first mode, a clock signal having a predetermined first repetitive frequency is transmitted as said first clock signal to said solid state imaging device and in addition another clock signal having a predetermined second repetitive frequency lower than the first repetitive frequency is transmitted as said second clock signal to said A/D converter, and when said solid state imaging device is selected in an operation mode to the second mode, a clock signal having a predetermined repetitive frequency is transmitted as said first clock signal and said second clock signal to said solid state imaging device and said A/D converter.

In the imaging circuit mentioned above, it is preferable that the repetitive frequency of the clock signal to be transmitted as said first clock signal and said second clock signal to said solid state imaging device and said A/D converter when said solid state imaging device is selected in an operation mode to the second mode is identical to the repetitive frequency of the second clock signal to be transmitted to said A/D converter when said solid state imaging device is selected in an operation mode to the first mode.

DESCRIPTION OF THE PREFERRED EMBODIMENTS

Hereinafter, there will be described embodiments of the present invention.

Figure 1:
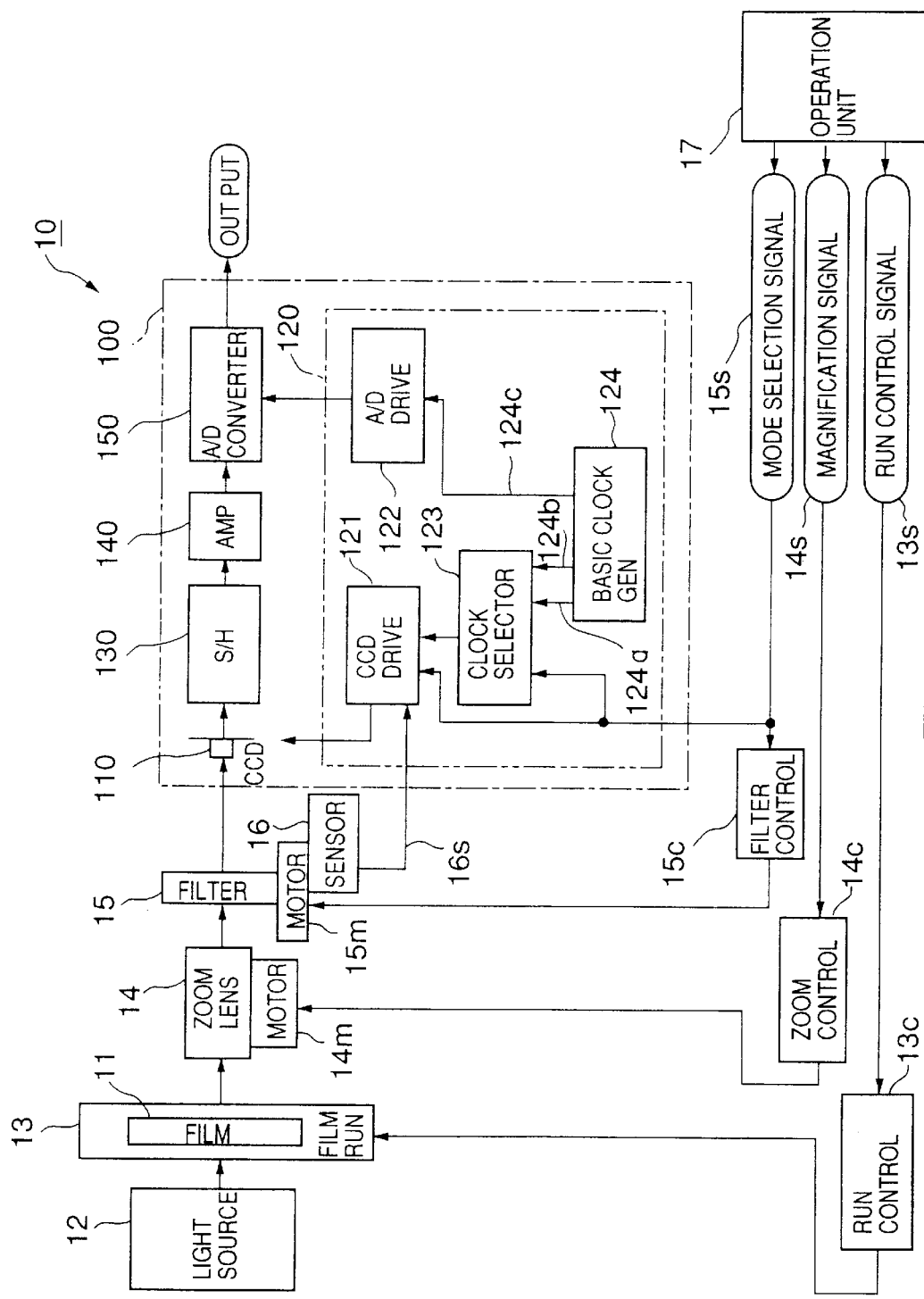
FIG. 1 is a block diagram of an imaging circuit according to one embodiment of the present invention.

FIG. 1 is a block diagram of an imaging circuit according to one embodiment of the present invention.

In FIG. 1, an imaging circuit 100 encircled with a dashed line analyzes for each frame an exposure state of an image on a negative film 11 of a photo finished in development. The imaging circuit 100 is incorporated into a photo development processing apparatus 10 for determining the respective optimum conditions.

The photo development processing apparatus 10 comprises: in addition to the imaging circuit 100, a light source unit 12 for applying light to a negative film 11; a film run unit 13 for moving the negative film 11 one by one in frame or stopping the same; a run control unit 13c for controlling an operation of the film run unit 13; a zoom lens unit 14 for enlarging an image on the negative film 11 into a desired magnification by a zoom lens; a motor 14m for adjusting a magnification of the zoom lens; a zoom control unit 14c for controlling the motor 14m; a rotary filter 15 for color-separating the image passing through the zoom lens unit 14; a motor 15m for driving the rotary filter 15; a position sensor 16 for detecting the position of rotation of the rotary filter 15 to determine a timing of taking in the image; a filter control unit 15c for controlling an operation of the motor 15m; and an operation unit 17 for operating the photo development processing apparatus 10 in its entirety.

The imaging circuit 100 comprises a solid state imaging device 110, a driving unit 120 encircled with a two-dot dash line, a S/H (Sample and Hold) unit 130, an amplifier 140 and an A/D converter 150.

The solid state imaging device 110 is constituted of a plurality of scan lines each comprising a plurality of light receiving elements arranged in a horizontal direction, the plurality of scan lines being arranged in a vertical direction. According to the present embodiment, the solid state imaging device 110 uses CCDs (Charge Coupling Devices) in which 494 scan lines each comprising 768 light receiving elements arranged in a horizontal direction are arranged in a vertical direction. The solid state imaging device 110 sequentially outputs light receiving signals in such a manner that the light receiving signals obtained through the light receiving elements arranged on the same scan line are continuously outputted in response to clock signals received from the driving unit 120.

The solid state imaging device 110 has two output modes optionally selectable in accordance with a mode selection signal 15s which will be described later. The first mode is an output mode in which the light receiving signals involved in 768 light receiving elements on each of 494 scan lines are added to one another and then outputted. The second mode is an output mode in which the light receiving signals involved in 768 light receiving elements arranged on one scanning line are sequentially outputted, and thereafter the light receiving signals involved in 768 light receiving elements arranged on another scanning line are sequentially outputted.

The driving unit 120 comprises a solid state imaging device driving unit 121, an A/D driving unit 122, a clock selector 123 and a basic clock generating unit 124. The details of the driving unit 120 will be described latter.

The S/H unit 130 sample-holds 768 pixels of light receiving signals outputted from the solid state imaging device 110 and converts the same into continuous analog video signals providing for a conversion processing from analog signals into digital signals in the subsequent A/D converter 150.

The amplifier 140 amplifies the analog video signals outputted from the S/H unit 130 to a level necessary for an A/D conversion of the A/D converter 150.

The A/D converter 150 converts the amplified analog video signals into the digital signals in accordance with clock signals received from the A/D driving unit 122.

The operation unit 17 outputs a run control signal 13s for controlling an operation of the film run unit 13, a magnification signal 14s for controlling an operation of the zoom lens unit 14, and a mode selection signal 15s for selecting the modes of the solid state imaging device 110.

The negative film 11 is loaded onto the film run unit 13 of the photo development processing apparatus 10 thus constructed. In this condition, when a frame of image on the negative film 11 is fed to a predetermined light receiving position in accordance with the run control signal 13s outputted from the operation unit 17, the negative film 11 is irradiated with light emanated from the light source 12. The image permeated through the negative film 11 reaches the zoom lens unit 14 in which the image is enlarged by the zoom lens adjusted to a predetermined magnification in accordance with the magnification signal 14s outputted from the operation unit 17, and then transferred to the rotary filter 15.

Figure 2:
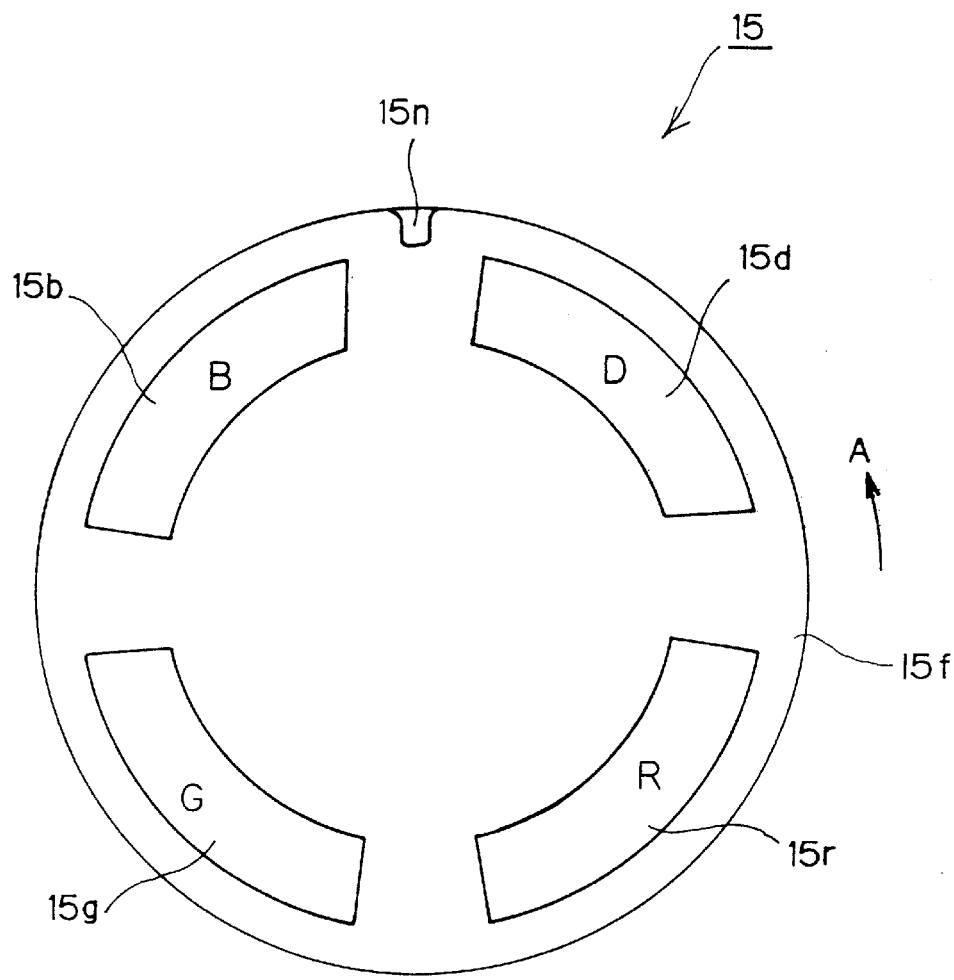
FIG. 2 is a plan view of a rotary filter used in the imaging circuit according to one embodiment of the present invention.

FIG. 2 is a plan view of a rotary filter used in the imaging circuit according to one embodiment of the present invention.

As shown in FIG. 2, the rotary filter 15 comprises a disk-like configuration of filter frame 15f and four types of filter plates 15d, 15r, 15g and 15b of black, red, green and blue which are mounted on four apertures of the filter frame 15f, respectively. The filter frame 15f is provided with a notch 15n for rotational position sensing.

The rotary filter 15 is controlled by the filter control unit 15c in accordance with the mode selection signal 15s and is driven by the motor 15m. A rotational period of the rotary filter 15 according to the present embodiment is about 152.5 m sec in case of the first mode and is about 446 m sec in case of the second mode.

When the rotary filter 15 rotates by the motor 15m in an arrow A of direction, the notch 15n is detected by the position sensor 16 for each rotation of the rotary filter 15. As a result, the position sensor 16 generates a position sensing signal 16s and the generated position sensing signal 16s is fed to the solid state imaging device driving unit 121.

The image, which has reached the rotary filter 15, is sequentially subjected to a color separation by four types of filter plates 15d, 15r, 15g and 15b whenever the rotary filter 15 rotates. Of the four types of filter plates the first filter plate 15d is a shading plate for supplying a reference signal of black to the imaging circuit 100, and the second, third and fourth filter plates 15r, 15g and 15b are transparent films for color-separating the image into red, green and blue, respectively. Consequently, four types of images, which are color-separated from a frame of image of the negative film into black, red, green and blue, respectively, are sequentially supplied to the solid state imaging device 110.

Figure 3:
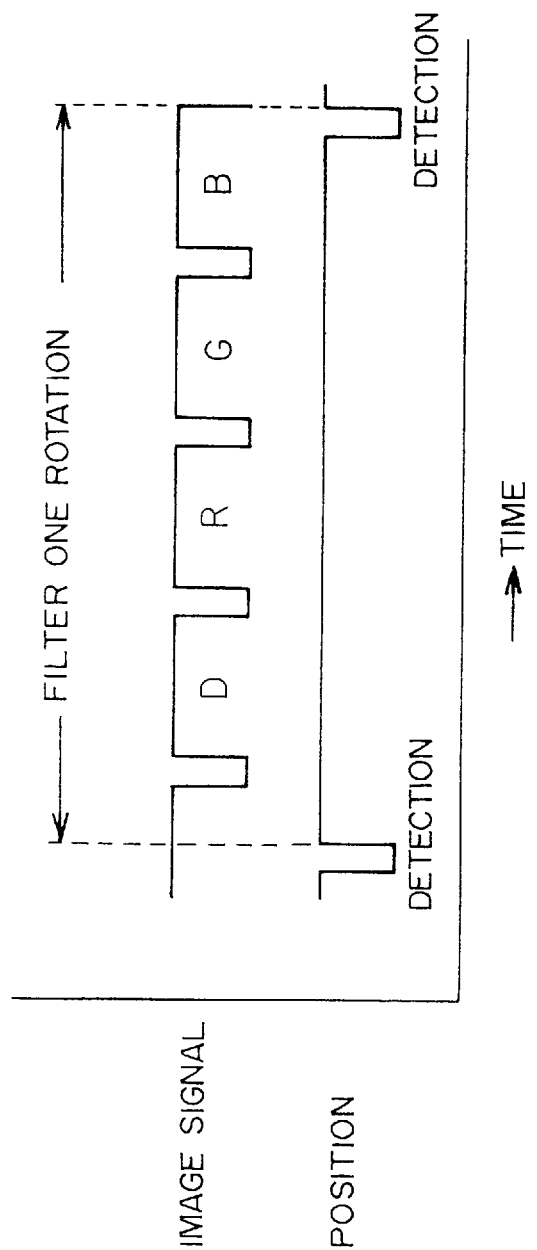
FIG. 3 is a time chart useful for understanding a detection timing of a position sensor used in the imaging circuit according to one embodiment of the present invention, and an output timing of image signals outputted from solid state imaging devices.

FIG. 3 is a time chart useful for understanding a detection timing of a position sensor used in the imaging circuit according to one embodiment of the present invention, and an output timing of image signals outputted from solid state imaging devices.

As shown in FIG. 3, during one rotation of the rotary filter 15 since the position sensing signal generated from the position sensor 16 is detected until the subsequent position sensing signal, the images, which are color-separated into black, red, green and blue, respectively, are sequentially supplied to the solid state imaging device 110, so that the solid state imaging device 110 sequentially outputs four types of image signals according to the respective colors of image signals in timing as shown in FIG. 3.

When the rotary filter 15 rotates once so that a frame of color separation of the negative film is terminated, the run control unit 13c causes the film run unit 13 to initiate a film feed in response to the run control signal 13s outputted from the operation unit 17 so as to feed the subsequent frame to a predetermined light receiving position.

The output signals generated from the solid state imaging device 110 are read out in accordance with two scanning schemes referred to as a noninterlace scheme and a interlace scheme. According to the interlace scheme, first time, the light receiving elements are scanned every other scanning line to read out signals so as to form a rough overall image (field image), and the second time, the light receiving elements are scanned every other scanning line, in such a manner that an interval of the scanning lines for the first time is supplemented, to read out signals so as to form a complete image (frame image). On the other hand, according to the noninterlace scheme, a plurality of scanning lines are scanned in turn to read out signals so as to form an image.

Figure 4:
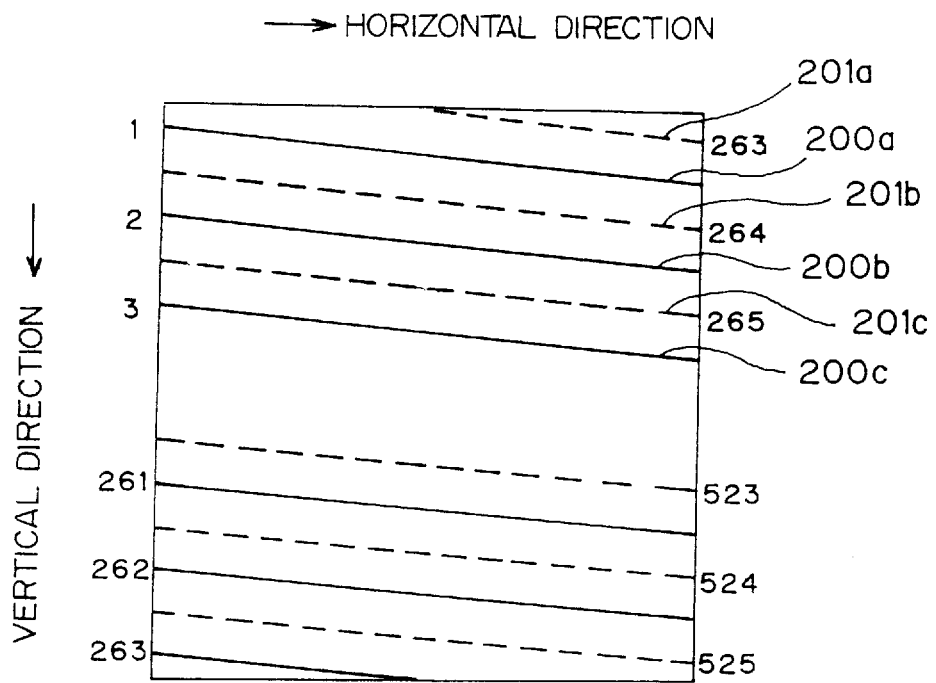
FIG. 4 is a view in which scanning line signals according to an interlace system, which are outputted from the solid state imaging devices, are illustrated on a two-dimensional basis.

FIG. 4 is a view in which scanning line signals according to an interlace system, which are outputted from the solid state imaging devices, are illustrated on a two-dimensional basis.

In FIG. 4, there are shown 525 scanning lines 200a, 200b, 200c, --- (solid line), 201a, 201b, 201c, - - - (broken line).

As mentioned above, according to the present embodiment, the solid state imaging device 110 uses CCDs (Charge Coupling Devices) in which 494 scanning lines each comprising 768 light receiving elements arranged in a horizontal direction are arranged in a vertical direction. The CCDs output a total of 525 scanning line signals comprising 494 scanning line signals based on the light receiving signals involved in the light receiving elements and 31 scanning line signals for 15.5 pieces of image data-free black area on each of the upper and lower sides.

Now referring to FIG. 4, the interlace scheme will be described. At the first time, there are sequentially outputted light receiving signals involved in 768 light receiving elements arranged on each of the scanning lines 200a, 200b, 200c, --- (solid line), which constitutes the field image, every other scanning line. And at the second time, there are sequentially outputted light receiving signals involved in 768 light receiving elements arranged on each of the scanning lines 201a, 201b, 201c, - - - (broken line) which are arranged every other scanning line in such a manner that an interval of the scanning lines for the first time is supplemented, so that the frame image is formed. In this manner, it is possible to obtain images involving less flicker on the screen.

By the way, when the solid state imaging device 110 is switched in the operation mode to the second mode in accordance with the mode selection signal 15s, the solid state imaging device 110 sequentially generates the signals scanned in according to the interlace scheme mentioned above.

On the other hand, when the solid state imaging device 110 is switched in the operation mode to the first mode, the light receiving elements of the solid state imaging device 110 are scanned in accordance with the noninterlace scheme, so that the solid state imaging device 110 outputs the light receiving signals in such a manner that the light receiving signals involved in 768 light receiving elements on each of 494 scanning lines arranged in the vertical direction are added individually to the associated ones of the light receiving signals involved in 768 light receiving elements on the adjacent scanning line, respectively. Specifically, referring to FIG. 4, the solid state imaging device 110 outputs the light receiving signals in such a manner that the light receiving signals involved in 768 light receiving elements on the scanning line 200a (solid line) are added individually to the associated ones of the light receiving signals involved in 768 light receiving elements on the adjacent scanning line 201b (broken line), respectively, and then the light receiving signals involved in 768 light receiving elements on the scanning line 200b (solid line) are added individually to the associated ones of the light receiving signals involved in 768 light receiving elements on the adjacent scanning line 201c (broken line), respectively. Hereinafter, in a similar fashion, the light receiving signals involved in the light receiving elements on the adjacent two scanning lines are added individually to each other.

Next, there will be described the driving unit 120 (cf. FIG. 1) used in the imaging circuit according to one embodiment of the present invention. As mentioned above, the driving unit 120 comprises the solid state imaging device driving unit 121, the A/D driving unit 122, the clock selector 123 and the basic clock generating unit 124.

First, there will be described the imaging circuit 100 with the function of the solid state imaging device driving unit 121 in the center.

Figure 5:
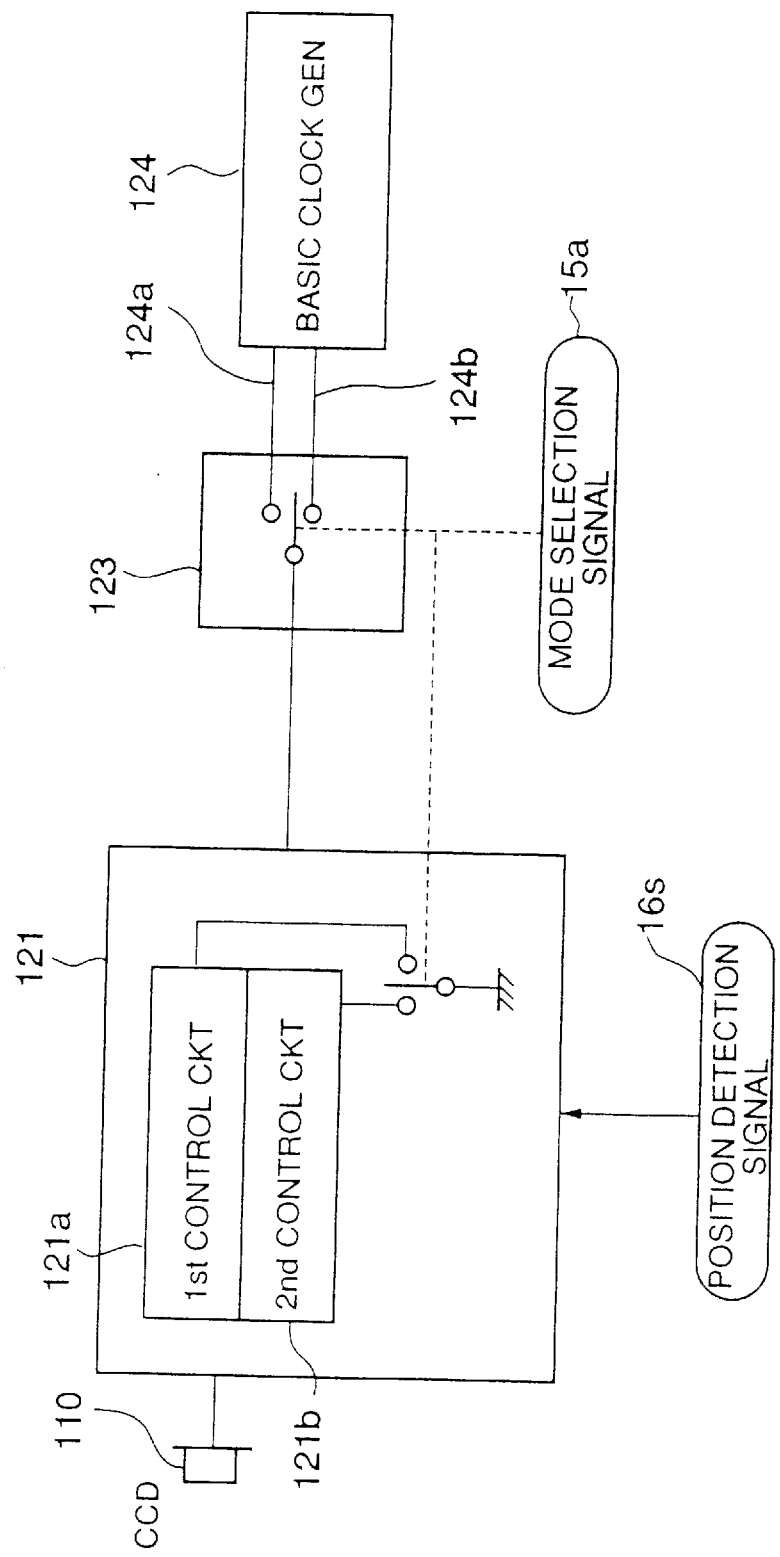
FIG. 5 is a block diagram of a part of a driving section used in the imaging circuit according to one embodiment of the present invention.

FIG. 5 is a block diagram of a part of the driving unit used in the imaging circuit according to one embodiment of the present invention.

FIG. 5 shows, of the driving unit 120, the solid state imaging device driving unit 121, the clock selector 123 and the basic clock generating unit 124. In FIG. 5, the A/D driving unit 122 is not illustrated.

The basic clock generating unit 124 generates the first clock signal to be supplied to the clock selector 123 and the second clock signal to be supplied to the A/D driving unit 122 (not illustrated). Regarding the first clock signal, there are two types of clock signals of which one is a first repetitive frequency (14.3 MHz) of clock signal 124a and another is a second repetitive frequency (7.15 MHz) of clock signal 124b. Regarding the second clock signal, there is only one type of a repetitive frequency (7.15 MHz) of clock signal 124c.

When the mode selection signal 15s is set up to the first mode, the clock selector 123 selects, of the two types of first clock signal supplied from the basic clock generating unit 124, the first repetitive frequency (14.3 MHz) of clock signal 124a and supplies the same to the solid state imaging device driving unit 121. On the other hand, when the mode selection signal 15s is set up to the second mode, the clock selector 123 selects, of the two types of first clock signal supplied from the basic clock generating unit 124, the second repetitive frequency (7.15 MHz) of clock signal 124b and supplies the same to the solid state imaging device driving unit 121.

The solid state imaging device driving unit 121 comprises two types of output control circuits of which one is a first output control circuit 121a for controlling an output of the solid state imaging device 110 in such a manner that a mode of the output of the solid state imaging device 110 is set up to the first mode, and another is a second output control circuit 121b for controlling an output of the solid state imaging device 110 in such a manner that a mode of the output of the solid state imaging device 110 is set up to the second mode.

When the mode selection signal 15s is a signal for instructing a selection of the first mode, the solid state imaging device driving unit 121 drives the solid state imaging device 110 with the first repetitive frequency (14.3 MHz) and selects the first output control circuit 121a. On the other hand, when the mode selection signal 15s is a signal for instructing a selection of the second mode, the solid state imaging device driving unit 121 drives the solid state imaging device 110 with the second repetitive frequency (7.15 MHz) and selects the second output control circuit 121b.

The A/D driving unit 122 (FIG. 1) serves, regardless of the mode selection signal 15s, to supply the second clock signal having the repetitive frequency (7.15 MHz) to the A/D converter 150 and drives the A/D converter 150.

The imaging circuit 100 operates as follows in accordance with an indication of a mode selection by the mode selection signal 15s.

(In case of the first mode)

When the mode selection signal 15s indicating a selection of the first mode is fed to the imaging circuit 100 (FIG. 1), the output control circuit of the solid state imaging device driving unit 121 for driving the solid state imaging device 110 is switched to the first output control circuit 121a, so that the mode of the solid state imaging device 110 is switched to the first mode in which the light receiving signals of the light receiving elements (768 pieces on each) of two adjacent scanning lines arranged in the vertical direction are individually added to each other and outputted.

The solid state imaging device driving unit 121 initializes a timing for taking in images in accordance with a position detection signal 16s outputted from the position sensor 16, and then transmits to the solid state imaging device 110 the first repetitive frequency (14.3 MHz) of clock signal 124a which is generated by the basic clock generating unit 124 and selected by the clock selector 123. In response to the clock signal 124a, the solid state imaging device 110 sequentially outputs the light receiving signals in such a manner that the light receiving signals obtained through the light receiving elements arranged on the same scanning line are continuously outputted.

In this manner, the solid state imaging device 110 set up to the first mode adds individually the light receiving signals obtained through two adjacent light receiving elements arranged in the vertical direction and outputs a resultant, and thus output levels of the similar adjacent two signal components are added to one another to form about twice signal level in average. On the other hand, the noise components of the adjacent two signals ought to be originally independently of one another, and thus even if those two signals are added to one another, the noise level goes no further than the approximately same level as that before the addition. Consequently, an S/N ratio raises about 6 dB. In other words, the dynamic range is increased about 6 dB. This makes it possible to facilitate the image analysis of the negative film. In this case, the number of horizontal scanning lines becomes half (247) of the original pieces (494), and thus the resolution as to the vertical direction is reduced by half. However, this is no problem for a use such as the analysis of the exposure state of the negative film.

In this manner, the solid state imaging device 110 set up to the first mode outputs to the S/H unit 130 the light receiving signals of the number of horizontal pixels 768 and the number of vertical pixels 247 on one frame. The S/H unit 130 sample-holds the light receiving signals outputted from the solid state imaging device 110 and outputs the same in the form of analog video signals. The amplifier 140 amplifies the analog video signals outputted from the S/H unit 130 to a level necessary for an A/D conversion and outputs the analog video signals thus amplified to the A/D converter 150.

The A/D driving unit 122 transmits the repetitive frequency (7.15 MHz) of clock signal 124c to the A/D converter 150, regardless of the set up mode of the mode selection signal 15s.

The A/D converter 150 converts the amplified analog video signals to the digital signal in accordance with the repetitive frequency (7.15 MHz) of clock signal 124c transmitted from the A/D driving unit 122.

The number of horizontal pixels 768, which are outputted from the solid state imaging device 110 driven with the repetitive frequency (14.3 MHz) is subjected to an A/D conversion with the repetitive frequency (7.15 MHz) which is half of the repetitive frequency (14.3 MHz) of the solid state imaging device 110, so that the number of horizontal pixels is reduced to half 384.

The reason why this is to do so is that when the number of samplings of the A/D converter 150 is given with 768 which is the same as the number of horizontal pixels 768 of the solid state imaging device 110, the sampling frequency becomes high as 14 MHz and this brings about 3 to 6 dB deterioration in the S/N ratio. In order to prevent this problem, the number of samplings of the A/D converter 150 is reduced.

Thus, while the resolution in the horizontal direction is reduced by half, the S/N ratio is improved about 6 dB. Consequently, it is possible to improve the dynamic range of the digital signals finally obtained by 12 dB, in addition to the improvement in the S/N ratio by about 6 dB according to reading two scanning lines as above mentioned.

(In case of the second mode)

When the mode selection signal 15s indicating a selection of the second mode is fed to the imaging circuit 100 (FIG. 1), the output control circuit of the solid state imaging device driving unit 121 for driving the solid state imaging device 110 is switched to the second output control circuit 121b, so that the mode of the solid state imaging device 110 is switched to the second mode in which the light receiving signals of the light receiving elements on one scanning line are sequentially outputted and then the light receiving signals of the light receiving elements on another scanning line are sequentially outputted.

The solid state imaging device driving unit 121 initializes a timing for taking in images in accordance with a position detection signal 16s outputted from the position sensor 16, and then transmits to the solid state imaging device 110 the second repetitive frequency (7.15 MHz) of clock signal 124b which is generated by the basic clock generating unit 124 and selected by the clock selector 123. In response to the clock signal 124b, the solid state imaging device 110 sequentially outputs the light receiving signals in such a manner that the light receiving signals obtained through the light receiving elements arranged on the same scanning line are continuously outputted.

The A/D driving unit 122 (FIG. 1) transmits the repetitive frequency (7.15 MHz) of second clock signal to the A/D converter 150, regardless of the mode selection signal 15s.

In this manner, the solid state imaging device 110 set up to the second mode outputs to the S/H unit 130 the light receiving signals of the number of horizontal pixels 768 and the number of vertical pixels 494 on one frame. The S/H unit 130 sample-holds the light receiving signals outputted from the solid state imaging device 110 and outputs the same in the form of analog video signals. The amplifier 140 amplifies the analog video signals outputted from the S/H unit 130 to a level necessary for an A/D conversion and outputs the analog video signals thus amplified to the A/D converter 150.

The A/D converter 150 converts the amplified analog video signals to the digital signal in accordance with the repetitive frequency (7.15 MHz) of clock signal 124c transmitted from the A/D driving unit 122.

In case of the second mode, since the solid state imaging device 110 and the A/D converter 150 are driven with the same frequency, the number of pixels in the horizontal direction as to the digital signals obtained in the second mode is the same 768 as the number of light receiving elements in the horizontal direction as to the solid state imaging device 110. Also the number of pixels in the vertical direction as to the digital signals obtained in the second mode is the same 494 as the number of light receiving elements in the vertical direction as to the solid state imaging device 110.

While the output signals, which are outputted from the solid state imaging device 110 driven with the repetitive frequency (14.3 MHz), have originally a high resolution such as 768×494 pieces, those signals are low in resolving power. In order to improve the resolving power without decreasing the S/N ratio, the repetitive frequency of the solid state imaging device 110 may be lowered. According to the present embodiment, the repetitive frequency of the solid state imaging device 110 is given with 7.15 MHz which is half of the original repetitive frequency 14.3 MHz.

As mentioned above, when the solid state imaging device 110 is switched in the operation mode to the first mode, the effective number of pixels of the digital signals obtained is given with 384 H×247 V. While this involves a deterioration in the resolution as compared with the second mode, it is possible to perform the image processing over high dynamic range and at high processing speed.

When the solid state imaging device 110 is switched in the operation mode to the second mode, it is possible to obtain the digital signals having a high resolution given with the effective number of pixels of 768 H×494 V. In this case, however, the processing speed is lowered by half of that in the first mode.

Incidentally, according to the present embodiment, there is shown an example in which the repetitive frequency of the clock signal of the A/D converter 150 in the first mode is half of the repetitive frequency of the clock signal of the solid state imaging device 110. However, the repetitive frequency of the clock signal of the A/D converter 150 in the first mode is not restricted to be half of the repetitive frequency of the clock signal of the solid state imaging device 110, and may be set up to be lower by the corresponding suitable frequency than the repetitive frequency of the clock signal of the solid state imaging device 110 in accordance with objects and uses of the imaging circuit.

Further, according to the present embodiment, there is shown an example in which the repetitive frequency of the clock signal of the solid state imaging device 110 and the A/D converter 150 in the second mode is half of the repetitive frequency of the clock signal of the solid state imaging device 110. However, the repetitive frequency of the clock signal of the solid state imaging device 110 and the A/D converter 150 in the second mode is not restricted to be half of the repetitive frequency of the clock signal of the solid state imaging device 110, and may be set up to be lower by the corresponding desired frequency than the repetitive frequency of the clock signal of the solid state imaging device 110 in accordance with objects and uses of the imaging circuit.

Incidentally, if there is provided such a design that the repetitive frequency of the clock signal of the solid state imaging device 110 and the A/D converter 150 in the second mode is the same as the repetitive frequency of the clock signal of the A/D converter 150 in the first mode, it is possible to simplify a circuit arrangement of the imaging circuit 100. This is preferable from a point of view of the cost reduction.

Further, according to the present embodiment, there is shown only an example in which in the first mode, the solid state imaging device simultaneously reads the adjacent two scanning lines. However, the number of scanning lines to be simultaneously read is not restricted to two pieces. It is acceptable to provide such an arrangement that three or more scanning lines may be simultaneously read. In this manner, an increment of the number of scanning lines to be simultaneously read permits the processing speed to be improved three times or more.

Further more, while the imaging circuit according to the present embodiment is of an arrangement in which the color separation means using the rotary filter for a color image processing is incorporated therein, the imaging circuit according to the present invention is not restricted to ones for a color image processing. It is easy also to arrange an imaging circuit for a black and white image processing by omitting the color separation means from the imaging circuit according to the present embodiment.

As described above, according to the imaging circuit according to the present invention, a single imaging circuit is provided with an output mode involved in a high dynamic range and an additional output mode involved in a high resolution, and it is possible to implement the imaging circuit capable of choosing the modes in two ways of use through a simple mode selection operation. Thus, there is no need to prepare different video cameras between a case that it is required that images are analyzed over a high dynamic range and a case that a high resolution of hard copy for appreciation or preservation is required. Therefore, it is possible to expect a high operability. Further, it is possible to simplify a circuit arrangement of an image processing apparatus in which an imaging circuit according to the present invention is incorporated thereinto, and also to contribute to reduction of the cost.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

We claim:

1. An imaging circuit comprising: a solid state imaging device in which a plurality of scanning lines each comprising a plurality of light receiving elements arranged in a predetermined first direction are arranged in a second direction intersecting the first direction, said solid state imaging device sequentially outputting in response to a predetermined first clock signal light receiving signals derived through the light receiving elements arranged on a same scanning line so that the light receiving signals are continuously outputted; and an A/D converter for converting the light receiving signals outputted from said solid state imaging device to digital signals in accordance with a predetermined second clock signal, wherein said solid state imaging device has a first mode in which the light receiving signals of a plurality of light receiving elements on a plurality of adjacent scanning lines arranged in the second direction are added to each other and outputted on a plurality of scanning lines basis, and a second mode in which the light receiving signals of the plurality of light receiving elements arranged on one scanning line are sequentially outputted on a one-by-one scanning line basis, said first and second modes being optionally selectable in accordance with a predetermined mode selection signal, and wherein said imaging circuit further comprises a driving unit in which when said solid state imaging device is selected in an operation mode to the first mode, a clock signal having a predetermined first repetitive frequency is transmitted as said first clock signal to said solid state imaging device and in addition another clock signal having a predetermined second repetitive frequency lower than the first repetitive frequency is transmitted as said second clock signal to said A/D converter, and when said solid state imaging device is selected in an operation mode to the second mode, a clock signal having a predetermined repetitive frequency is transmitted as said first clock signal and said second clock signal to said solid state imaging device and said A/D converter.

2. An imaging circuit according to claim 1, wherein the repetitive frequency of the clock signal to be transmitted as said first clock signal and said second clock signal to said solid state imaging device and said A/D converter when said solid state imaging device is selected in an operation mode to the second mode is identical to the repetitive frequency of the second clock signal to be transmitted to said A/D converter when said solid state imaging device is selected in an operation mode to the first mode.

* * * * *